(12) United States Patent
Lehman et al.

(10) Patent No.: US 7,331,389 B2
(45) Date of Patent: Feb. 19, 2008

(54) RE-USE OF RECOVERED TREATING FLUID

(75) Inventors: Lyle V Lehman, Katy, TX (US); Will E. Haley, Carter, OK (US); Jim Weaver, Duncan, OK (US); Billy Slabaugh, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 366 days.

(21) Appl. No.: 11/104,888

(22) Filed: Apr. 12, 2005

(65) Prior Publication Data

US 2005/0187114 A1    Aug. 25, 2005

Related U.S. Application Data

(62) Division of application No. 10/245,557, filed on Sep. 16, 2002, now Pat. No. 6,913,080.

(51) Int. Cl.
*E21B 43/22* (2006.01)
(52) U.S. Cl. ............... 166/279; 166/310; 166/369; 705/413
(58) Field of Classification Search .............. None
See application file for complete search history.

(56) References Cited

U.S. PATENT DOCUMENTS

| | | | |
|---|---|---|---|
| 4,366,063 A | 12/1982 | O'Conner | 210/652 |
| 4,436,635 A | 3/1984 | Abrams et al. | 210/806 |
| 4,502,959 A | 3/1985 | Hansen | 210/705 |
| 4,544,032 A | 10/1985 | Echols | 166/267 |
| 4,828,726 A | 5/1989 | Himes et al. | 252/8.553 |
| 4,974,678 A | 12/1990 | Himes et al. | 166/308 |
| 4,977,962 A | 12/1990 | Himes et al. | 166/294 |
| 5,097,904 A | 3/1992 | Himes | 166/294 |
| 5,197,544 A | 3/1993 | Himes | 166/305.1 |
| 5,271,466 A | 12/1993 | Harms | 166/300 |
| 5,330,005 A | 7/1994 | Card et al. | 166/280 |
| 5,439,055 A | 8/1995 | Card et al. | 166/280 |
| 5,501,275 A | 3/1996 | Card et al. | 166/280 |
| 5,735,349 A * | 4/1998 | Dawson et al. | 166/295 |
| 5,762,140 A * | 6/1998 | Hardy et al. | 166/295 |
| 5,775,415 A | 7/1998 | Yoshimi et al. | 165/202 |
| 5,787,986 A | 8/1998 | Weaver et al. | 166/280 |
| 5,833,000 A | 11/1998 | Weaver et al. | 166/276 |
| 5,839,510 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 6,047,772 A | 4/2000 | Weaver et al. | 166/276 |
| 6,488,091 B1 * | 12/2002 | Weaver et al. | 166/300 |
| 2003/0045708 A1 | 3/2003 | Magallanes et al. | 536/123 |

* cited by examiner

*Primary Examiner*—Zakiya W. Bates
(74) *Attorney, Agent, or Firm*—Robert A. Kent; Baker Botts, L.L.P.

(57) ABSTRACT

Treating fluid production and subterranean formation treating methods as well as treating fluid compositions that reuse at least part of a prior treating fluid, particularly a fluid having one or more constituents that can be relinked. This includes conditioning a selected at least partially delinked flow-back fluid recovered from a first treating fluid pumped into a well, such that the conditioned selected at least partially delinked flow-back fluid provides a constituent for a second treating fluid. Also included are pricing considerations. A composition for a treating fluid includes a treating fluid residual recovered from a well, preferably a conditioned treating fluid residual. Examples of such compositions include fracturing fluids and gravel pack fluids.

20 Claims, 3 Drawing Sheets

RE-USE OF RECOVERED TREATING FLUID

CROSS-REFERENCE TO RELATED APPLICATION

This application is a divisional of application Ser. No. 10/245,557 filed on Sep. 16, 2002, and issued as U.S. Pat. No. 6,913,080.

BACKGROUND OF THE INVENTION

This invention relates generally to treating fluid production and subterranean formation treating methods, as well as compositions for treating fluid, particularly as they include at least part of previously used treating fluid. "Treating" is used as understood in the oil and gas industry. For example, this includes stimulation treatments. Examples of such treatments to which the present is particularly suited are fracturing and gravel packing. Much of the following explanation will be given with reference to fracturing, which is one limitation as to narrower aspects of the present invention; however, the overall explanation and broader aspects of the invention should be considered in the context of well stimulation or well treatment in general.

Producing subterranean formations penetrated by well bores are often treated to increase their permeabilities or conductivities. One production stimulation treatment involves fracturing the formation utilizing a viscous treating fluid. That is, the subterranean formation or producing zone is hydraulically fractured whereby one or more cracks or "fractures" are produced. Fracturing may be carried out in wells that are completed in subterranean formations for virtually any purpose. The usual candidates for fracturing or other stimulation procedures are production wells completed in oil and/or gas containing formations. However, injection wells used in secondary or tertiary recovery operations for the injection of fluids may also be fractured to facilitate the injection of the fluids.

Hydraulic fracturing is accomplished by injecting a viscous fracturing fluid into a subterranean formation or zone at a rate and pressure sufficient to cause the formation or zone to break down with the attendant production of one or more fractures. As the fracture is created, a portion of the fluid contained in the viscous fracturing fluid leaks off into the permeable formation and a filter cake comprised of deposited gelling agent is built up upon the walls of the fracture which then helps to prevent or reduce further fluid loss from the fracturing fluid to the formation. The continued pumping of the viscous fracturing fluid extends the fractures, and a proppant such as sand or other particulate material may be suspended in the fracturing fluid and introduced into the created fractures. The proppant material functions to prevent the formed fractures from closing upon reduction of the hydraulic pressure which was applied to create the fracture in the formation or zone whereby conductive channels remain through which produced fluids can readily flow to the well bore upon completion of the fracturing treatment.

The fracturing fluid must have a sufficiently high viscosity to retain the proppant material in suspension as the fracturing fluid flows into the created fractures. A viscosifier has heretofore often been utilized to gel a base fluid whereby a fracturing fluid having the high viscosity needed to realize the maximum benefits from the fracturing process is provided. After the high viscosity fracturing fluid has been pumped into the formation and fracturing of the formation has occurred, the fracturing fluid generally has been caused to revert into a low viscosity fluid for removal from the formation by breaking the gel. The breaking of viscosified fracturing fluids has commonly been accomplished by adding a breaker to the fracturing fluid prior to pumping it into the subterranean formation.

The fracturing fluids utilized heretofore have predominantly been water based liquids containing a gelling agent comprised of a polysaccharide such as guar gum. Guar and derivatized guar polymers such as hydroxypropylguar are economical water soluble polymers which can be used to create high viscosity in an aqueous fluid and are readily crosslinked which further increases the viscosity of the fluid. While the use of gelled and crosslinked polysaccharide fracturing fluids has been highly successful, the fracturing fluids have not been thermally stable at temperatures above about 200° F. That is, the highly viscous gelled and crosslinked fluids lose viscosity with time at high temperatures. To offset the loss of viscosity, the concentration of the gelling agent has been increased which involves increased cost and causes increased friction pressure in the tubing through which the fluid is injected into a subterranean formation which makes pumping of the fracturing fluids more difficult. Thermal stabilizers such as sodium thiosulfate have been included in the fracturing fluids to scavenge oxygen and thereby increase the stabilities of the fracturing fluids at high temperatures. However, the use of thermal stabilizers also increases the cost of the fracturing fluids.

Another situation which has been experienced in the use of gelled and crosslinked polysaccharide fracturing fluids involves the breaking of such fracturing fluids after fractures have been formed. Breakers such as oxidizers, enzymes and acid release agents that attack the acetal linkages in the polysaccharide polymer backbone have been used successfully.

In order to make the heretofore used gelled and crosslinked polysaccharide fracturing fluids carry sufficient proppant, the concentration of the crosslinking agent utilized has often had to be increased which in turn increases the cost and viscosity of the fracturing fluid. The water based fracturing fluids including gelled and crosslinked polysaccharide gelling agents have had significantly reduced fluid loss as compared to other fracturing fluids which reduces or eliminates the need for costly fluid loss additives. However, because the gelled and crosslinked polysaccharides have had high molecular weights, the filter cake produced from the viscous fracturing fluid on the walls of well bores penetrating producing formations and in fractures formed therein is often very difficult to remove.

In the use of a water based fracturing fluid including a gelled and crosslinked polysaccharide gelling agent, it has been mixed in holding tanks for a considerable length of time for hydration of the gelling agent to occur. During the fracturing process carried out in a well, the hydrated fracturing fluid generally is pumped out of the holding tanks, mixed with proppant and other additives on the fly, and pumped down the well bore to the formation being fractured. If during the job the downhole pressure profile and other parameters that are obtained in real time indicate that a change in the fracturing fluid properties is required, that is, a change in the fracturing fluid viscosity to prevent a screen out of the fracture or the like, for example, it is generally difficult or impossible to do so since it takes a very long time for a change to be made and for the changed fracturing fluid to reach the formation being fractured. Also related to pumping the fracturing fluid from holding tanks and combining the proppant material, crosslinker and other additives used on the fly is that the procedure requires the use of expensive metering and other similar equipment.

Also, in many environmentally sensitive areas, the water based fracturing fluids containing polysaccharide gelling agents must be recovered from the well and disposed of by environmentally appropriate means, which increases the overall cost of the fracturing treatment.

Thus, there have been needs for improved subterranean formation treating fluids and methods whereby the fluids are not thermally unstable, do not produce insoluble residues, have high proppant carrying capacities, produce easily removed filter cake, do not have to be hydrated in holding tanks for long periods of time, can have their properties changed during use, and can be recovered and reused if desired.

One or more of such needs are met by the invention described in U.S. Pat. No. 6,488,091, issued Dec. 3, 2002, which invention provides subterranean formation treating fluid concentrates, improved treating fluids that can be utilized for fracturing as well as various other subterranean formation treatments, and methods of using the treating fluids.

A subterranean formation treating fluid concentrate of this prior invention is basically comprised of water and a depolymerized substantially fully hydrated polymer. The treating fluid concentrate can also include a variety of additives required to be in treating fluids produced utilizing the concentrate, such additives including pH adjusting compounds for adjusting the pH of the treating fluid formed with the concentrate, buffers, dispersants, surfactants for preventing the formation of emulsions between the treating fluid formed with the concentrate and subterranean formation fluids, bactericides and the like.

The treating fluid concentrate is prepared at a location away from the site of a well to be treated and transported to the well site prior to use. The concentrate is substantially fully hydrated and can be stored for long periods of time prior to its use. When used, the concentrate is continuously mixed with water and any additional additives required and pumped into the subterranean formation to be treated by way of the well bore penetrating it. Because there is very little time delay involved in mixing the treating fluid concentrate with additional water and other additives and pumping the treating fluid formed into a subterranean formation, the properties of the treating fluid can be periodically or continuously changed during the time that the pumping of the treating fluid takes place.

The improved subterranean formation treating fluids of such prior invention are basically comprised of water, a substantially fully hydrated depolymerized polymer, a pH adjusting compound for adjusting the pH of the treating fluid to an optimum level for crosslinking, and a crosslinking agent for crosslinking the substantially fully hydrated depolymerized polymer. While the improved subterranean formation treating fluids of this prior invention can be utilized for carrying out a variety of subterranean well treatments such as fracturing subterranean formations, forming gravel packs in subterranean formations, forming temporary blocking in the well bore, and as completion fluids and drill-in fluids, they are particularly useful as fracturing fluids for producing one or more fractures in a subterranean formation. When utilized as a fracturing fluid, the treating fluid generally contains a crosslinking agent and a proppant material which are mixed with the treating fluid when it is formed by mixing the treating fluid concentrate described above with additional water. The substantially fully hydrated depolymerized polymer utilized in the concentrate and the treating fluid produced therefrom is preferably a depolymerized polysaccharide polymer, and most preferably depolymerized hydroxypropylguar.

In accordance with a method of the prior invention, a gelled and crosslinked treating fluid is prepared comprised of water, a substantially fully hydrated depolymerized polymer, a pH adjusting compound for adjusting the pH of the treating fluid to an optimum pH for crosslinking, and a crosslinking agent for crosslinking the substantially fully hydrated depolymerized polymer. Thereafter, the gelled and crosslinked treating fluid is introduced into the subterranean formation to be treated. Particularly in the context of a fracturing treatment, the subterranean formation is contacted with the gelled and crosslinked fracturing fluid under conditions effective to create at least one fracture in the subterranean formation. After a fracture is created in the formation, a proppant material may be admixed with a portion of the fracturing fluid and introduced into the created fracture to ultimately prop the created fracture in an open position after the completion of the fracturing treatment.

One feature of the aforementioned prior invention is that the depolymerized polymer which is crosslinked to increase the viscosity of the treating fluid as desired can be delinked (uncrosslinked) and later relinked, whereby at least this part of the prior treating fluid can be reused in a later-prepared treating fluid. This may reduce cost of treating fluid itself as well as of disposal of it, and it may reduce exposure to volatile markets or supplies of fluid constituents and to quality assurance issues. Cost reduction due to reuseability of part of a prior treating fluid can make otherwise more expensive treating fluids accessible to more wells.

Although the aforementioned prior invention satisfies one or more of these needs, there are additional needs, such as how to accomplish this reusability and what type of composition to provide for reuse. Particular needs include how to select and maintain a reusable portion of a prior fracturing fluid and how to prepare it for reuse. Another need includes pricing for such reuse.

SUMMARY OF THE INVENTION

The present invention meets one or more of the aforementioned needs by providing novel and improved treating fluid production and subterranean formation treating methods as well as compositions for treating fluids, all of which relate to reuse of at least part of a prior treating fluid.

A treating fluid production method in accordance with the present invention comprises conditioning a selected at least partially delinked flow-back fluid, recovered from a first treating fluid pumped into a well, such that the conditioned selected at least partially delinked flow-back fluid provides a constituent for a second treating fluid. Although not limiting of the aforementioned definition of the present invention, the invention may be defined in its narrower aspects specific to fracturing. One such definition is as a fracturing fluid production method comprising conditioning a selected at least partially delinked flow-back fluid, recovered from a first fracturing fluid pumped into a well, such that the conditioned selected at least partially delinked flow-back fluid provides a constituent for a second fracturing fluid.

The present invention also provides a method of treating a subterranean formation intersected by a well, comprising performing a treatment on a well using a treating fluid residual recovered from a prior treatment, wherein using a treating fluid residual recovered from a prior treatment includes conditioning the recovered treating fluid residual.

A method of fracturing a subterranean formation in accordance with the present invention can be defined as comprising: receiving flow-back fluid from a well undergoing a fracturing treatment; selecting at least a portion of received flow-back fluid to put in a storage vessel; conditioning fluid put in the storage vessel to a first pH; conditioning fluid of the storage vessel to a second pH; and adding conditioned fluid into a new fracturing fluid. This can further comprise filtering at least one of the flow-back fluid and the conditioned fluid.

Another definition of a method of fracturing a subterranean formation in accordance with the present invention comprises: pumping a fracturing fluid into a well under pressure to fracture a formation intersected by the well, wherein the fracturing fluid includes a linked substantially fully hydrated depolymerized polymer; storing a fracturing fluid residual recovered from the well, which stored fracturing fluid residual includes formerly linked polymer that is delinked; and maintaining pH of the stored fracturing fluid residual between about 7 and about 13. This may further comprise lowering the pH of the stored fracturing fluid residual below 7 prior to using at least a portion of stored fracturing fluid residual in a second fracturing fluid. In an embodiment in which pH is maintained between about 7 and less than 11, the method may also comprise raising the pH of the stored fracturing fluid residual to above 11 after maintaining pH between about 7 and less than 11.

Still another definition of a method of treating a subterranean formation in accordance with the present invention comprises: recovering treating fluid residual from a first treatment, the recovered treating fluid residual including a depolymerized polymer selected from the group consisting of hydroxypropylguar, carboxymethylhydroxypropylguar, carboxymethylguar, hydroxyethylguar, carboxymethylhydroxyethylguar, hydroxyethyl cellulose, grafted hydroxyethyl cellulose, carboxymethyl cellulose and carboxymethylhydroxyethyl cellulose; pH-conditioning recovered treating fluid residual; and performing a second treatment, including using at least part of the pH-conditioned recovered treating fluid residual.

Further in accordance with the present invention, a method of treating a subterranean formation intersected by a well comprises: pricing the cost of a second treatment in response to potential reuse of a treating fluid residual from a first treatment; and reusing in the second treatment, in response to the pricing, a treating fluid residual actually recovered from the first treatment.

Another method of treating a subterranean formation intersected by a well in accordance with the present invention comprises: pricing the cost of both a first treatment and a second treatment in response to potential reuse of a treating fluid residual from the first treatment in the second treatment; and reusing in the second treatment, in response to the pricing, a treating fluid residual actually recovered from the first treatment.

Still another definition of the present invention is a method of performing a plurality of subterranean formation treatments, comprising: pricing the cost of a plurality of sequential subterranean formation treatments in response to potential reuse of treating fluid residuals from prior treatments in the sequence in subsequent treatments in the sequences; and reusing, in response to the pricing, a treating fluid residual recovered from a prior treatment in the sequence in a subsequent treatment in the sequence until the sequence of subterranean formation treatments is performed.

Also provided by the present invention is a composition for a treating fluid, which composition comprises a treating fluid residual recovered from a well, wherein the treating fluid residual includes delinked polymer and the treating fluid residual has a stored pH in the range between about 7 and about 13. This may further comprise an additive added to the treating fluid residual such that the composition has an initial re-use pH less than about 7 and in particular an initial re-use pH between about 5 and about 6.5. Such composition may have, in at least one particular implementation, a viscosity within the range between about 2 centipoise and about 20 centipoise. The delinked polymer preferably includes guar, guar derivative, depolymerized guar with or without derivatizing, or synthetic polymer. The delinked polymer of a particular implementation includes a polysaccharide selected from the group consisting of hydroxypropylguar, carboxymethylhydroxypropylguar, carboxymethylguar, hydroxyethylguar, carboxymethylhydroxyethylguar, hydroxyethyl cellulose, grafted hydroxyethyl cellulose, carboxymethyl cellulose and carboxymethylhydroxyethyl cellulose.

The foregoing have particular suitability for fracturing fluids and for gravel pack fluids and residuals thereof obtained from respective fracturing and gravel packing processes.

Therefore, from the foregoing, it is a general object of the present invention to provide novel and improved treating fluid production and subterranean formation treating methods as well as compositions for treating fluids, all of which relate to reuse of at least part of a prior treating fluid. Other and further objects, features and advantages of the present invention will be readily apparent to those skilled in the art when the following description of the preferred embodiments is read in conjunction with the accompanying drawings.

DETAILED DESCRIPTION OF THE INVENTION

A method of treating a subterranean formation intersected by a well in accordance with the present invention comprises performing a treatment on a well using a treating fluid residual recovered from a prior treatment. Using the treating fluid residual recovered from the prior treatment includes conditioning the recovered treating fluid residual. The conditioning steps themselves define treating fluid production methods of the present invention. While the invention applies broadly to treating fluids, more specific aspects relate to stimulation treatments, two of which include fracturing and gravel packing. Because the broader aspects will readily be understood given a specific explanation of the present invention, such explanation will be given in the context of fracturing.

Figure 1:
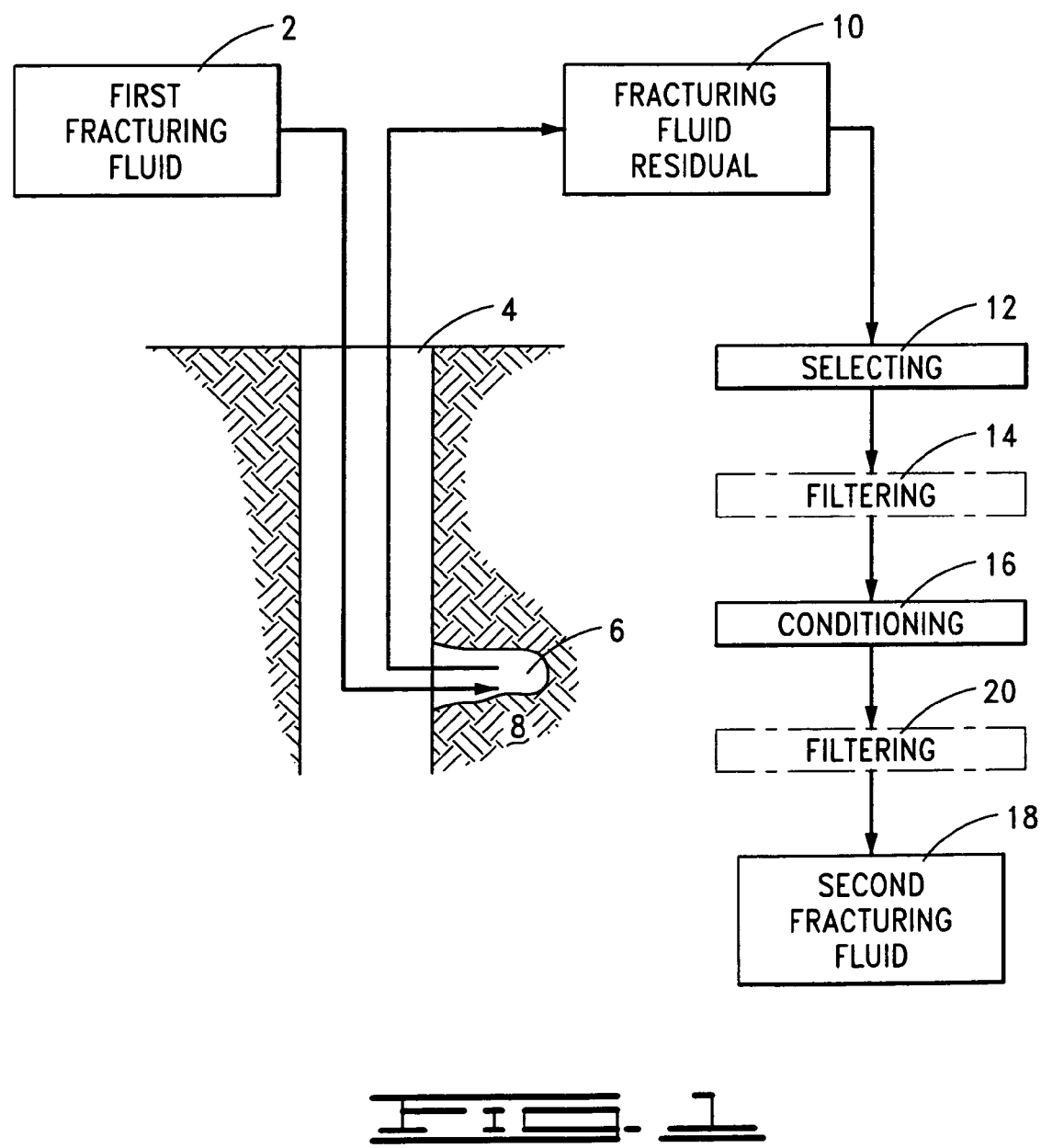
FIG. 1 is a schematic and block diagram for illustrating a method of the present invention.

Referring particularly to FIG. 1, the illustrated method of treating (specifically fracturing in this example) a formation comprises receiving flow-back fluid from a well undergoing a fracturing treatment. The fracturing treatment is shown in FIG. 1 as providing a fracturing fluid 2. In the ordinary course of performing the fracturing treatment, the fracturing fluid 2 is pumped into well 4 which has suitable internal structure as known in the art to perform a fracturing treatment (including to isolate the respective formation or zone intersected by the well and to be fractured), and pressure is applied to such fluid sufficient to form one or more fractures 6 in subterranean formation or zone 8 (it is noted that fracture 6 may extend in other directions as well, but only the view of FIG. 1 is shown for simplicity). During the fracturing treatment, typically the well is shut-in and then reopened whereupon at least part of the fracturing fluid 2 in the fracture 6 is forced out by the fracture closure pressure as known in the art. At least part of this fluid flows back to the surface as the flow-back fluid or fracturing fluid residual 10 represented in FIG. 1.

The fracturing fluid that is pumped into the well under pressure typically undergoes linking to increase the fluid's viscosity and thus its proppant-carrying ability. During the fracturing process itself and typically also as a result of one or more delinkers in the fluid, delinking occurs (preferably after the proppant has been carried into the fracture) whereby the viscosity of any flow-back fluid is relatively low, typically relative to both the viscosity of initially formulated fracturing fluid and the viscosity of the linked fluid. Although delinking likely occurs as to most of the linked material, as a practical matter 100% of the bonds defining linking may not be delinked; therefore, reference is made in this description and in the claims to the flow-back fluid/residual being "at least partially" delinked to encompass both partial and complete delinking, whichever may occur in any particular use of the present invention.

As the fracturing fluid residual 10 is received at the surface, at least a portion of the fluid is selected to put in a storage vessel. In one implementation of the present invention, the fracturing fluid residual 10 is received in one or more flow-back tanks from which the viscosity of the flow-back fluid can be monitored. Such fluid is received in the flow-back tank(s) until the viscosity is at its lowest acceptable level, which level has been predetermined based on various factors as further explained below.

After the desired fracturing fluid portion has been selected as indicated at reference numeral 12 in FIG. 1, that portion is transferred (preferably through suitable filtering 14) from the flow-back tank(s) to and stored in one or more storage vessels in which the fluid is conditioned as indicated by reference numeral 16 in FIG. 1. Conditioned fluid of the storage vessel is ultimately added into a new fracturing fluid as indicated at reference numeral 18 in FIG. 1 (as between fracturing fluid 2 and fracturing fluid 18, fracturing fluid 2 may be referred to as the first fracturing fluid and fracturing fluid 18 may be referred to as the second fracturing fluid). Filtering 20 can also be performed on the conditioned fluid as indicated in FIG. 1. At least one (as indicated by the dot-dash lining used for these two features of FIG. 1) of filtering 14 and filtering 20 is typically performed, one purpose of which is to remove solids or particulate from the fluid; if such filtering is not needed, it need not be used.

In general, the fracturing fluid 2 (or more generally the treating fluid) is a "relinkable" type, that is, one having one or more constituents that can be linked, delinked and then again linked, preferably repeatedly. Preferred examples of these include guar, guar derivatives, depolymerized guar with or without derivatizing, and synthetic polymers. In a particular embodiment of the present invention, the fracturing fluid 2 includes a linked substantially fully hydrated depolymerized polymer. During the fracturing process, the polymer becomes delinked, whereby the stored fracturing fluid residual includes formerly linked polymer that has become delinked. In a specific embodiment, the substantially fully hydrated depolymerized polymer includes a polysaccharide selected from the group consisting of hydroxypropylguar, carboxymethylhydroxypropylguar, carboxymethylguar, hydroxyethylguar, carboxymethylhydroxyethylguar, hydroxyethyl cellulose, grafted hydroxyethyl cellulose (for example, hydroxyethyl cellulose grafted with glycidol or vinyl phosphonic acid), carboxymethyl cellulose and carboxymethylhydroxyethyl cellulose, such as described in U.S. Pat. No. 6,488,091, incorporated herein by reference. Synthetic polymers can be used by depolymerizing existing molecules or building them to the correct molecular weight. Such material of whatever type is included in the fracturing fluid residual that is recovered and conditioned prior to performing a subsequent fracturing treatment in which at least part of the conditioned recovered fracturing fluid residual is used.

In a preferred embodiment, selecting 12 includes determining what viscosity of flow-back fluid is to be obtained in the storage vessel. In a particular implementation using the aforementioned particular compositions, the viscosity to be obtained is within the range between about 2 centipoise and about 20 centipoise (as compared to a viscosity of about 8 centipoise to about 20 centipoise for a fracturing fluid having one or more constituents from the aforementioned group and ready to flow into a well as at reference numeral 2 in FIG. 1; and as compared to a viscosity of about 700 centipoise to about 2000 centipoise for such a fracturing fluid having become linked such as for carrying proppant into well 4 in FIG. 1). Making such a determination may include making a cost analysis that includes fracturing fluid new constituent costs and flow-back fluid disposal costs. For example, before the first fracturing treatment illustrated in FIG. 1 begins, one determines how low of a viscosity is to be allowed to be selected from the flow-back fluid or residual. The lower viscosity one accepts in the residual to be reused, the more new material may need to be added to formulate a second fracturing fluid having a sufficient viscosity. Using more new additive materials would be more expensive than not using them; however, the overall cost may be lower when considering how much it would cost to dispose of the flow-back fluid that would otherwise not be selected or when considering the cost of obtaining more fresh water, for example.

In general, conditioning 16 occurs with regard to a selected at least partially delinked flow-back fluid, recovered from the first fracturing fluid 2 pumped into the well 4, such that the conditioned selected at least partially delinked flow-back fluid 10 provides a constituent for the second fracturing fluid 18. More specifically, in a preferred embodiment, conditioning 16 includes maintaining pH of selected flow-back fluid in the storage vessel within a selected range. Using the compositions mentioned above, such conditioning includes in a preferred embodiment one or more of the following: (a) maintaining pH of the selected at least partially delinked flow-back fluid within a range between about 7 and about 11, (b) raising the pH to greater than 11, (c) lowering the pH to a level preventing premature linking. Such conditioning may further include adding a bactericide in effective amount to prevent or reduce growth of bacteria in the selected at least partially delinked flow-back fluid. Such conditioning may still further include maintaining the selected at least partially delinked flow-back fluid at a selected viscosity.

In maintaining the flow-back fluid while stored prior to reuse, the pH of the stored fluid may be maintained as high as 13. The preferred pH is about 7 to about 8.5 because this is the natural pH of the flow-back fluid; however, if bacterial problems are encountered the pH may be raised to get rid of the bacteria—preferably this would be to a pH greater than 11. This higher pH is generally not preferred because the state of crosslink makes such higher pH fluid more difficult to handle in as much as pumping the material at the higher pH may be very difficult. The selected pH is maintained by adding some base to the storage tank and rolling it to mix the base into the fluid. Examples include sodium hydroxide, potassium hydroxide or any other soluble hydroxide. Sodium carbonate or potassium carbonate can also be used.

In view of the foregoing, raising the pH to greater than 11 as mentioned above as one of the possible conditioning steps typically is done after the pH has been maintained at least for some time at a lower pH within the broader pH range of about 7 to 11, such as for example the aforementioned range of about 7 to 8.5, or some other pH less than 11. In a different situation, but still encompassed by the reference to raising pH to greater than 11, raising the pH to greater than 11 can be implemented with the second treating fluid as the reused flow-back fluid is added.

Conditioning 16 can also include, as mentioned above, lowering pH of fluid in the storage vessel, preferably below the selected range of pH at which the conditioned stored fluid has been maintained until ready for re-use. Thus, for the aforementioned selected range of the conditioned stored fluid between a pH of about 7 and about 13, such further conditioning comprises lowering (typically at or about the time of reuse) the pH of the stored fracturing fluid residual below 7 prior to using at least a portion of stored fracturing fluid residual in a second fracturing fluid. Normally an acid such as hydrochloric, acetic, formic or other suitable acid is added to the storage tank contents, which are rolled to mix. This lowers the pH of the selected at least partially delinked flow-back fluid to a level preventing premature linking before using such conditioned fluid in producing the second fracturing fluid. Such premature linking could occur because of pH-responsive linker that was in fracturing fluid 2 and that remains in the selected at least partially delinked flow-back fluid thereof. This can more particularly include lowering the pH of the conditioned selected at least partially delinked flow-back fluid to a pH within the range of pH between about 5 and about 6.5. So, in at least the embodiment wherein the second fracturing fluid 18 is to have new substantially fully hydrated depolymerized polymer added to it, in addition to the reused fluid that has been conditioned in accordance with the present invention, the new polymer will raise the pH of the resultant fluid but not sufficiently to activate the residual linker until a desired time, such as when more linker is added and the second fracturing fluid 18 is pumped into the well in which it is to be used. This is especially important when new polymer is added to reused polymer in a batch, as opposed to an on-the-fly, procedure.

Because there typically is some amount of linker in the fracturing fluid residual, using a fracturing fluid residual in accordance with the present invention may further include measuring the amount of linker in the conditioned fracturing fluid residual. This can be implemented by using known techniques for measuring linker in a volume of fluid. The present invention may then also comprise determining how much more linker is needed in the second fracturing fluid, such as by subtracting the amount of linker measured to be in the fluid from a desired total amount that has been computed in known manner.

As a result of conditioning in accordance with the present invention, or as may otherwise arise, a composition for a treating (such as fracturing for the context referred to above) fluid of the present invention is provided. The composition comprises a treating fluid residual recovered from a well, wherein the treating fluid residual includes delinked polymer and the treating fluid residual has a stored pH in the range between about 7 and about 13. The treating fluid residual having the stored pH may more particularly also have a viscosity within the range between about 2 centipoise and about 20 centipoise. The delinked polymer is preferably guar, guar derivative, depolymerized guar with or without derivatizing, or synthetic polymer as referred to above; however, in a particularly preferred implementation, the delinked polymer is of the specific type referred to above, namely one selected from the above-identified group. The present invention provides a further composition using the foregoing one and further comprising an additive added to the treating fluid residual such that the composition has an initial re-use pH less than about 7. In a particular implementation the initial re-use pH is between about 5 and about 6.5.

Whereas the aforementioned selecting typically occurs at the site of the well 4, as the flow-back out of the well occurs and the residual is received there, the conditioning can occur there or elsewhere. That is, once residual fluid has been selected, it can be further used wherever desired. For example, if the reuse is to occur at the same well, the selected fluid may likely be stored there; or if the reuse is to occur in the same vicinity, the selected fluid may likely be stored at the original well site or at some more convenient, possibly centralized location; or if the reuse is to occur somewhere else or at a then unidentified time or place, the selected fluid may be stored wherever is deemed appropriate.

The method of the present invention further comprises filtering the selected or conditioned fluid as shown at reference numerals 14 and 20 in FIG. 1. This is typically done to clear the fluid of particulate matter, such as by using 5 to 10 micron filter screens in conventional filtering manner for example.

The foregoing is used in forming the second fracturing fluid 18 for performing a second treatment (second relative to a first treatment performed using the relative first fluid 2, as illustrated in FIG. 1). This can further include using previously unused polymer compatible with the conditioned recovered treating fluid residual to be reused. This can also include using other constituents as known in the art (non-limiting examples include clay control additives and surfactants as well as conductivity enhancers). The second fracturing fluid 18 can be formed using a batch procedure or preferably an on-the-fly procedure that permits real-time changes to be readily made.

The foregoing can be used in implementing other fracturing methods of the present invention. One such other method comprises pricing the cost of a second fracturing treatment in response to potential reuse of a fracturing fluid residual from a first fracturing treatment; and reusing in the second fracturing treatment, in response to the pricing, a fracturing fluid actually recovered from the first fracturing treatment.

Another definition of a method of the present invention comprises: pricing the cost of both a first fracturing treatment and a second fracturing treatment in response to potential reuse of fracturing fluid residual from the first fracturing treatment in the second fracturing treatment; and reusing in the second fracturing treatment, in response to the pricing, a fracturing fluid residual actually recovered from the first fracturing treatment.

Still another definition of a method of performing a plurality of fracturing treatments comprises: pricing the cost of a plurality of sequential fracturing treatments in response to potential reuse of fracturing fluid residuals from prior fracturing treatments in the sequence in subsequent fracturing treatments in the sequence; and reusing, in response to the pricing, a fracturing fluid residual recovered from a prior fracturing treatment in the sequence in a subsequent fracturing treatment in the sequence until the sequence of fracturing treatments is performed.

Such pricing as just referred to above may include one or more of a variety of factors. Non-limiting examples include: anticipated savings from reuse versus new material costs and disposal costs; risk exposure (for example, environmental contamination) arising from retrieving, conditioning, storing and transporting the flow-back fluid; profit margin considerations (for example, gross profit equivalency relative to other types of fracturing processes and relative to an individual well or a group of wells); whether to charge a customer a fee for the amount of "first" fracturing fluid not reused (that is, charge for the volume of fluid used for that customer); whether to charge a fixed or variable reuse fee to offset the expense for maintaining a supply of previously used fluid; and whether to charge for multiple reuse jobs for the same customer at a fixed rate per job or at a variable rate (such as higher prices for earlier jobs in a sequence of jobs but decreasing from job to job to some minimum or baseline charge for later jobs in the sequence); viscosity of "first" treating fluid; viscosity of flow-back fluid; amount of retrieved flow-back fluid; cost of conditioning; cost of bactericide; storage and transportation costs; and labor costs.

In one embodiment, for whatever factors are selected, ratios or weights are assigned to each factor to define that particular factor's significance to the pricing. Preferably using a computer of known type, one computes the pricing, such as per unit of fluid to be reused or relative to an entire quantity to be used in a treating process. The overall treating fluid quantity can be determined in known manner for designing a particular treating job. The reuse portion can be based on the aforementioned pricing calculation (for example, a sum of all the weighted factors based on a per unit of reused flow back fluid). Once this determination has been made, actual reuse of actual flow-back fluid can be controlled in response to the computed desired amounts.

Figure 2:
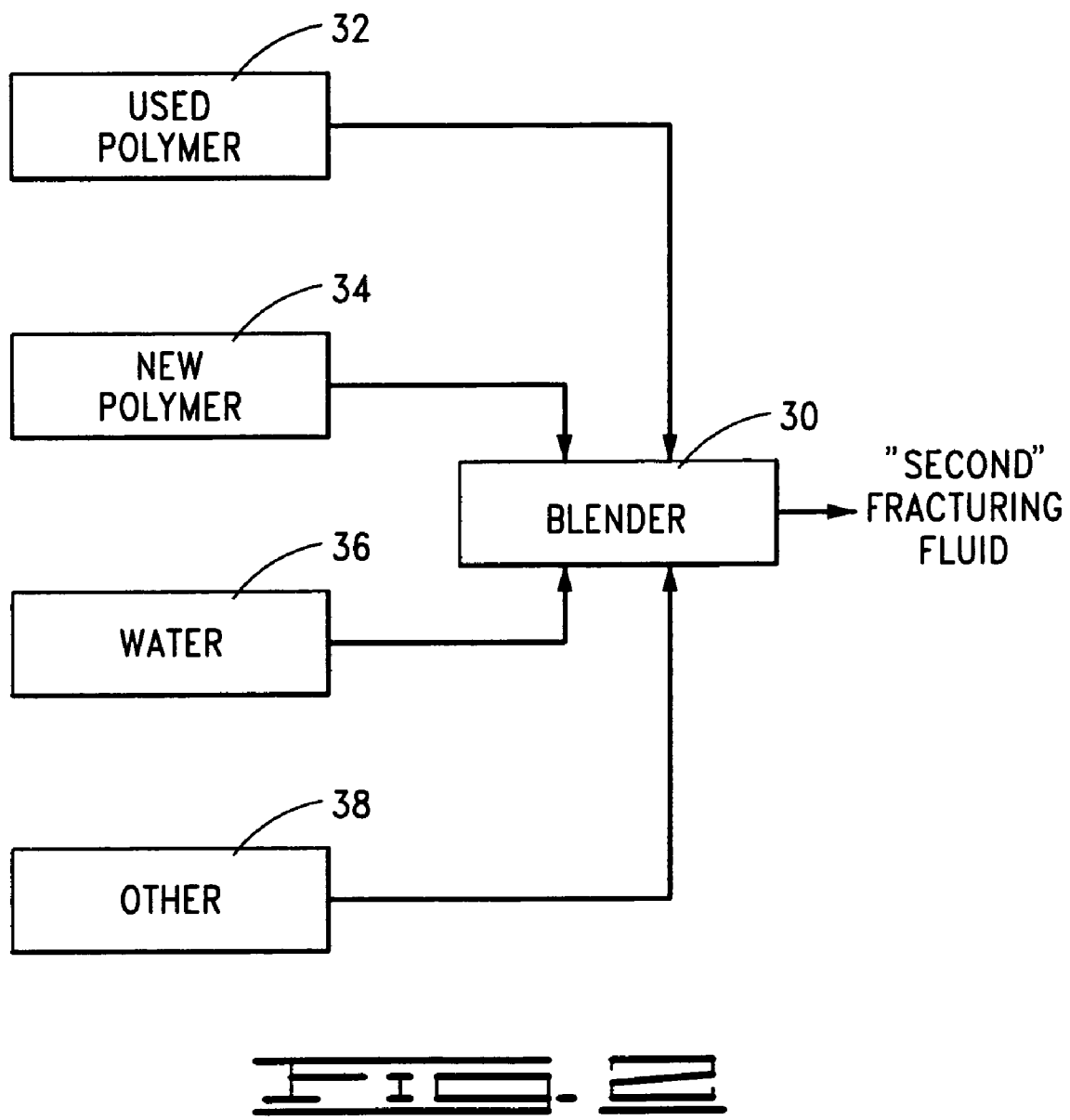
FIG. 2 is a block diagram representing a system that can be used for implementing a method of the present invention.

Referring next to FIG. 2, a system through which the second fracturing fluid (and subsequent "second" fracturing fluids) can be created is represented. Each of these can be implemented with known equipment but with the source of used polymer provided in accordance with the present invention. The system of FIG. 2 includes a conventional blender 30 of a type suitable for blending the selected materials to form a fracturing fluid. Used polymer as described above is provided from one or more vessels 32. New polymer is provided from one or more vessels 34, with water coming from one or more sources 36 to provide the aqueous base for the fracturing fluid. Other constituents come from one or more respective sources 38 as known in the art.

Figure 3:
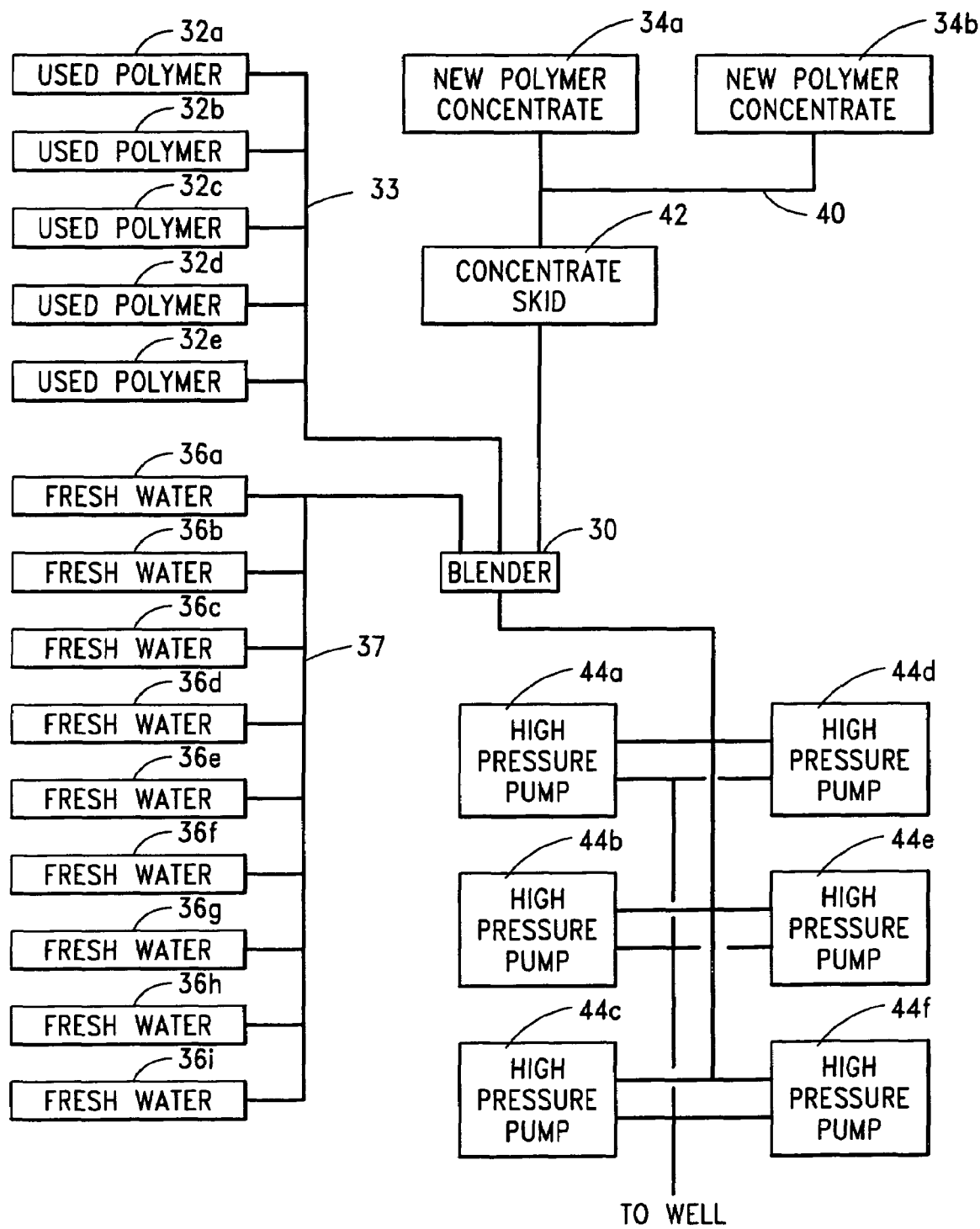
FIG. 3 is a block diagram representing a particular embodiment for the system of FIG. 2.

A particular implementation of the general system illustrated in FIG. 2 is represented in FIG. 3; however, it is to be noted that this particular assemblage of equipment does not limit the scope of the present invention. Used polymer, such as in accordance with the present invention, is held in five storage tanks 32a-32e connected, such as through a manifold 33, to the blender 30. New polymer concentrate, such as the type from the group defined above, is obtained from either or both of storage vessels 34a, 34b, which may provide outputs through a manifold 40, for example, to a concentrate skid 42 of a type known in the art, for example.

Nine fresh water tanks 36a-36i are illustrated in FIG. 3 as providing the aqueous base to the blender 30 through manifold 37. The foregoing provide their flows into blender 30 whose output is provided to inlets of six high pressure pumps 44a-44f. Outlets of the high pressure pumps 44a-44f communicate with the well that is to undergo the second fracturing treatment using the second fracturing fluid. Quality assurance equipment (for example, a pH meter, a hand held spectrometer, a setup for titrating chlorides and the normality of the fluid) can be used to maintain the operation. The equipment referred to above with regard to FIG. 3 can be of types known in the art.

The present invention described above also includes repeating the foregoing whereby a series of "first" and "second" fracturing (or more generally, treating) fluids are used and reused. Such repetition may occur until there is too little material to reuse or the material available for reuse is contaminated (such as by salt water from a subterranean formation or zone) or economic factors or other reason.

Following is a section giving further explanation pertinent to an at least substantially fully hydrated depolymerized polymer and a "first" treating fluid of the prior art that can be reused in accordance with the present invention.

The substantially fully hydrated depolymerized polymer may be manufactured by various means. The polymer may be manufactured by forming a hydratable polymer having a relatively high molecular weight as a result of derivatization of a polysaccharide and then subjecting it to extensive depolymerization whereby the polymer backbone is divided into short chain polymer segments. The manufacture of such polymers can be made by derivatization and depolymerization techniques known in the art or as described in United States Application entitled "Galactomannan Compositions and Methods for Making and Using the Same," (Jesse Magallanes, Sylvain Diguet, William Stivers) (hereinafter referred to as the Magallanes application cited in U.S. Patent Application No. 2003/0045708 published on Mar. 6, 2003). According to one embodiment of the invention, the depolymerized polymer of the present invention may be prepared by adding the polymer to be depolymerized to a reactor vessel together with a quantity of hydrogen peroxide and water. In a preferred embodiment, the depolymerized galactomannan polymer is prepared by the methods described in the Magallanes application, the entire disclosure of which is incorporated herein by reference. The reactor vessel may be heated to an elevated temperature such as about 100° F. to initiate the reaction if the ambient temperature is insufficient to initiate the reaction. Once initiated, the depolymerization reaction is exothermic and the temperature of the reactor vessel generally should be maintained in the range of from about 100-200° F. for a sufficient time for the polymer to degrade to the desired molecular weight. Alternatively, the polymer may be formed from lower molecular weight monomers that are polymerized until the desired molecular weight is achieved. The hydratable polymer utilized for forming the short chain segments can be substantially any polysaccharide, preferably one selected from the group consisting of hydroxypropylguar, carboxymethylhydroxypropylguar, carboxymethylguar, hydroxyethylguar, carboxymethylhydroxyethylguar, hydroxyethyl cellulose, hydroxyethyl cellulose grafted with glycidol or vinyl phosphonic acid, carboxymethyl cellulose, carboxymethylhydroxyethyl cellulose and the like. Of these, depolymerized hydroxypropylguar is preferred. The depolymerized polymer should have an average molecular weight in the range of from about 25,000 to about 400,000 and preferably has an average molecular weight in the range of from about 100, 000 to about 250,000. The depolymerized polymer preferably should have a polydispersity ratio of from 1 to about 12 as determined by gel permeation chromatography as disclosed in "Practical High Performance Liquid Chromatography" edited by C. F. Simpson (Hyden & Son Ltd., 1976). The polydispersity ratio of polysaccharides or other polymers generally can range from about 2 to as much as 250. The depolymerized polymer of the present invention has been found to exhibit the superior properties identified herein when maintained within the indicated polydispersity ratio. If desired for purposes of transportation, storage or otherwise, the depolymerized polymer may be stored in dry form and, when needed, can be rehydrated to form the treating fluid concentrate. The substantially fully hydrated depolymerized polymer is admixed with the water in an amount in excess of about 6% by weight of the concentrate to form the treating fluid concentrate. Preferably, the polymer is present in an amount of from about 6% to in excess of about 30% by weight and most preferably from about 6% to about 20% by weight of the concentrate. The viscosity of the treating fluid concentrate generally may be in the range of from about 15,000 in excess of about 35,000 centipoise (cps) as determined with a Brookfield DV II+RV spring viscometer manufactured by Brookfield Engineering Laboratories of Middleboro, Mass. The viscosity is determined by measurements performed at a temperature of about 75° F. and a rotational speed of 20 rpm using an LV3 bob. Other similar instruments also can be used to measure the viscosity of the fluid concentrate.

The water utilized to form the treating fluid concentrate can be fresh water, unsaturated salt water or saturated salt water. Generally, the substantially fully hydrated depolymerized polymer utilized in the present invention is mixed with the water in an amount in the range of from about 6% to about 30% by weight of the water.

In some instances it may be desirable to add a dispersing agent to the polymer for dispersing the depolymerized hydratable polymer when it has been stored in a dry form and facilitating its rehydration in water. Any of a variety of dispersing agents known to those individuals of ordinary skill in the art may be utilized. A particularly suitable dispersing agent has been found to be a light hydrocarbon oil such as diesel oil, kerosene, olefins or the like. Another dispersing agent is polyethyleneglycol. Of these, diesel oil is preferred. When an oil dispersing agent is utilized, it is included with the polymer in an amount in the range of from about less than 5% to in excess of about 60% by weight of the polymer.

A variety of other additives can be included in a concentrate of this type at the time of its manufacture. Such additives generally include pH adjusting compounds for adjusting the pH of the treating fluid to an optimum or desired pH for crosslinking when it is formed with the concentrate. Examples of such compounds which can be utilized include, but are not limited to, formic acid, fumaric acid, acetic acid, acetic anhydride, hydrochloric acid, sodium hydroxide, potassium hydroxide, lithium hydroxide, various carbonates or any other commonly used pH control agent which does not adversely react with the polymer to prevent its use in accordance with the method of the present invention. Of these, sodium hydroxide is preferred. When used, the pH adjusting compound is included in the concentrate in an amount in the range of from about 0.5% to about 10% by weight of the water therein.

A pH buffer also can be included in the concentrate. Examples of buffers which can be used include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. When used, the buffer is included in the concentrate in an amount in the range of from about 0.5% to about 10% by weight of the water therein.

Another additive which can be included in the concentrate is a surfactant for preventing the formation of emulsions between the treating fluid which is formed with the concentrate and subterranean formation fluids. Examples of surfactants which can be used include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride and the like. Of these, salts of dodecylbenzene sulfonic acids are preferred. When used, the surfactant is included in the concentrate in an amount in the range of from about 0.01% to about 1% by weight of the water in the treatment fluid. Substantially any other surfactant that is known to be suitable for use in the treatment of subterranean formations and which does not adversely react with the fluid may be utilized.

Yet another additive which can be included in the concentrate is a clay stabilizer. Examples of clay stabilizers which can be used include, but are not limited to, potassium chloride, sodium chloride, ammonium chloride and tetramethyl ammonium chloride and the like. Examples of some temporary clay stabilizers that are suitable for use in the present invention are disclosed in for example U.S. Pat. Nos. 5,197,544; 5,097,904; 4,977,962; 4,974,678; 4,828,726, the entire disclosures of which are incorporated herein by reference. Of these, potassium chloride and tetramethyl ammonium chloride are preferred. When used, the clay stabilizer is included in the concentrate in an amount in the range of from about 2% to about 20% by weight of the water therein.

When the concentrate is mixed with additional water and any other desired additives to form a subterranean treating fluid, no hydration time is required since the concentrate is already substantially fully hydrated. The additional water is mixed with the concentrate in a water to concentrate ratio in the range of from about 4:1 to about 20:1 depending upon the final viscosity desired in the treating fluid. The water utilized can be fresh water, unsaturated salt water including brines or seawater, or saturated salt water.

In order to increase the viscosity of the treating fluid formed with the concentrate, a crosslinking agent is mixed with the water and concentrate. The crosslinked short chain segments of the substantially fully hydrated depolymerized polymer in the concentrate are crosslinked by the crosslinking agent thereby producing a viscous treating fluid having properties, including the following: (1) The treating fluid including the extensively depolymerized hydrated and crosslinked polymer segments has thermal stability at temperatures above about 200° F. and preferably from about 200 to about 275° F. without the use of gel stabilizers. (2) The crosslinked treating fluids referred to in this section produce filter cake containing low molecular weight polymer segments which make the filter cake easily removable. (3) As described above, the treating fluids of this section do not have to be prehydrated and the treating fluid is mixed with additional water and additives on the surface in a very short time making real time changes in the properties of the treating fluid as it is being pumped possible. (4) The treating fluids of this section produce very little residue when reduced in viscosity. The treating fluid concentrate described in this section is processed during its manufacture to remove residue from the concentrate. As a result, the low residue producing treating fluids produce fractures having higher conductivities than the heretofore used treating fluids. (5) As will be described further hereinbelow, the treating fluids of this section can, when certain polymers and crosslinkers are employed, include acid reversible crosslink sites. When certain crosslinkers are utilized, the crosslinks are broken simply by lowering the pH to a level below about 9. In this pH range, the treating fluid is not crosslinked and yet the acetal linkages which form the crosslinking sites are stable and can be recrosslinked. This feature allows the treating fluid to be recovered from a treated subterranean formation and well bore and reused rather than having to be disposed of in environmentally sensitive locations.

The improved subterranean formation treating fluids of this section are basically comprised of water, a substantially fully hydrated depolymerized polymer and a crosslinking agent for crosslinking the hydrated depolymerized polymer. As mentioned above, the water can be selected from fresh water, unsaturated salt water including brines and seawater and saturated salt water.

As indicated above relating to the treating fluid concentrate, the substantially fully hydrated depolymerized polymer in the treating fluid can be a depolymerized polysaccharide and is preferably selected from the group consisting of hydroxypropylguar, carboxymethylhydroxypropylguar, carboxymethylguar, hydroxyethylguar, carboxymethylhydroxyethylguar, hydroxyethyl cellulose, grafted hydroxyethyl cellulose, carboxymethyl cellulose, and carboxymethylhydroxyethyl cellulose. Of these, substantially fully hydrated depolymerized hydroxypropylguar is most preferred. The substantially fully hydrated depolymerized polymer utilized is generally present in the treating fluid in an amount in the range of from about 0.2% to about 5% by weight of the water therein.

Examples of preferred crosslinking agents which can be utilized in the treating fluid include, but are not limited to, boron compounds such as, for example, boric acid, disodium octaborate tetrahydrate, sodium diborate and pentaborates, ulexite and colemanite, compounds which can supply zirconium IV ions such as, for example, zirconium lactate, zirconium lactate triethanolamine, zirconium carbonate, zirconium acetylacetonate and zirconium diisopropylamine lactate, compounds that can supply titanium IV ions such as, for example, titanium ammonium lactate, titanium triethanolamine, titanium acetylacetonate, aluminum compounds such as aluminum lactate or aluminum citrate or compounds that can supply antimony ions. Of these, a borate compound, is the most preferred. The exact type and amount of crosslinking agent or agents used depends upon the specific depolymerized polymer to be crosslinked, formation temperature conditions and other factors known to those individuals skilled in the art. The crosslinking agent utilized is included in the treating fluid in an amount in the range of from about 50 ppm to about 5000 ppm active crosslinker.

As also mentioned above in connection with the concentrate, a pH adjusting compound for adjusting the pH of the treating fluid to the optimum pH for crosslinking can be included in the treating fluid. The pH adjusting compound can be selected from sodium hydroxide, potassium hydroxide, lithium hydroxide, fumaric acid, formic acid, acetic acid, hydrochloric acid, acetic anhydride and the like. Of these, sodium hydroxide is preferred. The pH adjusting compound is included in the treating fluid in an amount in the range of from about 0% to about 0.3% by weight of the water in the treating fluid.

When the preferred crosslinking agent is used, that is, a borate compound, the pH adjusting compound is utilized to elevate the pH of the treating fluid to above about 9. At that pH, the borate compound crosslinking agent crosslinks the short chain hydrated polymer segments. When the pH of the crosslinked treating fluid falls below about 9, the crosslinked sites are no longer crosslinked. Thus, when the crosslinked fracturing fluid of this section contacts the subterranean formation being treated, the pH is lowered to some degree which begins the breaking process. In order to cause the fracturing fluid to completely revert to a thin fluid in a short period of time, a delayed delinker capable of lowering the pH of the treating fluid can be included in the treating fluid. Examples of delayed delinkers which can be utilized include, but are not limited to, various lactones, esters, encapsulated acids and slowly soluble acid generating compounds, oxidizers which produce acids upon reaction with water, water reactive metals such as aluminum, lithium and magnesium and the like. Of these, the esters are preferred. The delinker is included in the treating fluid in an amount in the range of from about 0% to about 1% by weight of the water therein. Alternatively, any of the conventionally used delayed breakers employed with metal ion crosslinkers can be utilized, for example, oxidizers such as sodium chlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, maltase, cellulase and hemicellulase. The specific breaker or delinker utilized, whether or not it is encapsulated, as well as the amount thereof employed will depend upon the breaking time desired, the nature of the polymer and crosslinking agent, formation characteristics and conditions and other factors.

When the subterranean formation treating fluid of this section is utilized for carrying out a fracture stimulation procedure, proppant material is included in at least a portion of the treating fluid as it is pumped into the subterranean formation to be fractured and into fractures created therein. The proppant material is metered into the treating fluid as the treating fluid is formed, and the quantity of proppant material per volume of treating fluid preferably can be changed as required in real time. Examples of proppant material which can be utilized include, but are not limited to, resin coated or uncoated sand, sintered bauxite, ceramic materials or glass beads. The proppant material utilized is generally included in the treating fluid in an amount in the range of from about 1 to about 24 pounds of proppant material per gallon of the treating fluid.

As mentioned above in connection with the concentrate, additional components that can be included in the treating fluid of this section and which can be a part of the treating fluid concentrate used to form the treating fluid include a buffer selected from the group consisting of sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. Of these, sodium carbonate is preferred. The buffer is generally present in the treating fluid in an amount in the range of from about 0% to about 0.3% by weight of water therein.

The treating fluid as well as the concentrate can also include a surfactant for preventing the formation of emulsions between the treating fluid and subterranean formation fluids contacted by the treating fluid. Examples of such surfactants include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde anionic resin blends, cocobetaines, dioctyl sodium sulfosuccinate, imidazolines, alpha olefin sulfonates, linear alkyl ethoxylated alcohols, trialkyl benzylammonium chloride and the like. Of these, dodecylbenzene sulfonic acid salts are preferred. The surfactant is generally present in the treating fluid in an amount in the range of from about 0% to about 0.1% by weight of the water therein.

The treating fluid and the concentrate can also include a clay stabilizer selected, for example, from the group consisting of potassium chloride, sodium chloride, ammonium chloride and tetramethyl ammonium chloride and the like. Of these, potassium chloride and tetramethyl ammonium chloride are preferred. When used, the clay stabilizer is generally present in the treating fluid in an amount in the range of from about 0.5% to about 10% by weight of the water therein.

Other additives can be included in a subterranean formation treating fluid of this section which are not normally in the treating fluid concentrate used to form the treating fluid. For example, in applications where a fluid loss control agent must be included in the treating fluid, a fluid loss control agent can be metered into the blender during the mixing of the treating fluid. Examples of fluid loss control agents which can be used include, but are not limited to, silica flour, starches, waxes and resins. The fluid loss control agent is included in the treating fluid in an amount in the range of from about 0% to about 1% by weight of water therein.

The subterranean formation treating fluid can also include compounds for retarding the movement of the proppant introduced in the fluid within the created fracture. For example, materials in the form of fibers, flakes, ribbons, beads, shavings, platelets and the like comprised of glass, ceramics, carbon composite, natural or synthetic polymers or metals and the like can be admixed with the fluid and proppant introduced into the subterranean formation to retard or prevent the movement of the introduced proppant. A more detailed description of the foregoing materials is disclosed in, for example, U.S. Pat. Nos. 5,330,005; 5,439,005; and 5,501,275 the entire disclosures of which are incorporated herein by reference. Alternatively, or in addition to the prior materials, a material comprising a tackifying compound may be admixed with the fluid or the proppant to cost at least a portion of the proppant or other solid materials identified above such that the coated material and particulate adjacent thereto will adhere together to form agglomerates which will bridge in the created fracture to prevent particulate flowback. The tackifying compound also may be introduced into the formation with the treatment fluid prior to or after the introduction of the proppant into the formation. The coated material is effective in inhibiting the flowback of fine particulate in the proppant pack having a size ranging from about that of the proppant to less than about 600 mesh. The coated proppant or other material is effective in consolidating fine particulates in the formation in the form of agglomerates to prevent the movement of the fines during production of the formation fluids from the well bore subsequent to the treatment. A more detailed description of the use of the foregoing tackifying compound and the methods of use thereof is disclosed in U.S. Pat. Nos. 5,775,415; 5,787,986; 5,833,000; 5,839,510; 5,871,049; 5,853,048; and 6,047,772 the entire disclosures of which are incorporated herein by reference thereto.

Additional additives that can be included in the treating fluids of this section which are well known to those skilled in the art include, but are not limited to, scale inhibitors, demulsifiers, clay stabilizers, bactericides, breaker activators and the like.

The subterranean formation treatment fluids of the present invention also may include substantially any of the conventionally known foaming agents which do not adversely react with the fluid constituents such that a gaseous compound such as nitrogen, air, carbon dioxide or another gasifying compound can be admixed with the fluid to form a foam for introduction into the subterranean formation. The gaseous compound can be admixed with the fluid in an amount of from 5% to in excess of 90% to form a foamed treatment fluid for use in stimulating a subterranean formation. When foamed, the fluid provides the same benefits as are found in the use of other foamed treatment fluids. The foamed fluid results in less polymer being introduced into the formation, can provide improved fluid loss control and can provide a gas assist in removing the treatment fluid from the well bore at the conclusion of the treatment.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of treating a flow-back fluid, comprising:
  receiving a flow-back fluid from a well undergoing a fracturing treatment;
  selecting at least a portion of the received flow-back fluid to put in a storage vessel by determining what viscosity of flow-back fluid is to be obtained in the storage vessel utilizing a cost analysis that considers factors including fracturing fluid new constituent cost and flow-back fluid disposal cost;
  conditioning the flow-back fluid put in the storage vessel to a first pH;
  conditioning the flow-back fluid of the storage vessel to a second pH; and
  adding conditioned flow-back fluid into a new fracturing fluid.

2. The method of claim 1, further comprising filtering at least one of the received flow-back fluid and the conditioned flow-back fluid.

3. A method of pricing a treatment for a subterranean formation intersected by a well, comprising:
  pricing the cost of a second treatment for a subterranean formation intersected by a well in response to potential reuse of a treating fluid residual from a first treatment of a subterranean formation intersected by a well, wherein the treating fluid residual that is considered in the pricing comprises a substantially fully hydrated depolymerized polymer; and
  reusing in the second treatment, in response to the pricing, a treating fluid residual actually recovered from the first treatment, wherein the treating fluid residual actually recovered from the first treatment comprises a substantially fully hydrated depolymerized polymer, and wherein the second treatment may be performed in the same or different well as the first treatment.

4. The method of claim 3, wherein the treating fluid residual is a fracturing fluid residual.

5. The method of claim 3, wherein the treating fluid residual is a gravel pack fluid residual.

6. The method of claim 3 wherein the step of pricing the cost of a second treatment in response to potential reuse of a treating fluid residual from a first treatment comprises pricing a potential reuse in which the treating fluid residual from the first treatment would be conditioned before it is used in a second treatment, and wherein the step of reusing the treating fluid residual that is actually recovered comprises conditioning the treating fluid residual before it is used in a second treatment.

7. The method of claim 3 wherein pricing the cost of a second treatment in response to potential reuse of a treating fluid residual from a first treatment comprises pricing in response to at least one of the factors selected from the group consisting of: anticipated savings from reuse versus new material costs and disposal costs; risk exposure arising from retrieving, conditioning, storing and transporting the treating fluid residual; gross profit equivalency relative to other types of treatments and relative to an individual well or a group of wells; fees charged for the volume of treating fluid from the first treatment that is not reused; fixed or variable reuse fees charged to offset the expense for maintaining a supply of previously used fluid; fees charged for multiple reuse jobs for the same customer; viscosity of a treating fluid used in a first treatment; viscosity of a treating fluid residual from the first treatment; amount of treating fluid residual recovered; cost of any treating fluid residual conditioning steps; cost of any bactericide used; storage and transportation costs; labor costs; and a combination of the foregoing factors.

8. The method of claim 7 wherein each factor that is selected is assigned a ratio or weight to define that factor's significance to the pricing.

9. A method of pricing a treatment for a subterranean formation intersected by a well, comprising:

pricing the cost of both a first treatment of a subterranean formation intersected by a well and a second treatment of a subterranean formation intersected by a well in response to potential reuse of a treating fluid residual from the first treatment in the second treatment, wherein the treating fluid residual that is considered in the pricing comprises a substantially fully hydrated depolymerized polymer; and reusing in the second treatment, in response to the pricing, a treating fluid residual actually recovered from the first treatment, wherein the treating fluid residual actually recovered from the first treatment comprises a substantially fully hydrated depolymerized polymer, and wherein the second treatment may be performed in the same or different well as the first treatment.

10. The method of claim 9, wherein the treating fluid residual is a fracturing fluid residual.

11. The method of claim 9, wherein the treating fluid residual is a gravel pack fluid residual.

12. The method of claim 9 wherein the step of pricing the cost of both a first treatment and a second treatment in response to potential reuse of a treating fluid residual from the first treatment in the second treatment comprises pricing a potential reuse in which the treating fluid residual from the first treatment would be conditioned before it is used in the second treatment, and wherein the step of reusing the treating fluid residual that is actually recovered comprises conditioning the treating fluid residual before it is used in a second treatment.

13. The method of claim 9 wherein pricing the cost of both a first treatment and a second treatment in response to potential reuse of a treating fluid residual from the first treatment in the second treatment comprises pricing in response to at least one of the factors selected from the group consisting of: anticipated savings from reuse versus new material costs and disposal costs; risk exposure arising from retrieving, conditioning, storing and transporting the treating fluid residual; gross profit equivalency relative to other types of treatments and relative to an individual well or a group of wells; fees charged for the volume of treating fluid from the first treatment that is not reused; fixed or variable reuse fees charged to offset the expense for maintaining a supply of previously used fluid; fees charged for multiple reuse jobs for the same customer; viscosity of a treating fluid used in a first treatment; viscosity of a treating fluid residual from the first treatment; amount of treating fluid residual recovered; cost of any treating fluid residual conditioning steps; cost of any bactericide used; storage and transportation costs; labor costs; and a combination of the foregoing factors.

14. The method of claim 13 wherein each factor that is selected is assigned a ratio or weight to define that factor's significance to the pricing.

15. A method of pricing a plurality of subterranean formation treatments, comprising:

pricing the cost of a plurality of sequential subterranean formation treatments in response to potential reuse of treating fluid residuals from prior treatments in the sequence in subsequent treatments in the sequence, wherein the treating fluid residuals that are considered in the pricing comprise a substantially fully hydrated depolymerized polymer; and reusing, in response to the pricing, a treating fluid residual recovered from a prior treatment in the sequence in a subsequent treatment in the sequence until the sequence of subterranean formation treatments is performed, wherein the treating fluid residuals recovered from the prior treatments comprise a substantially fully hydrated depolymerized polymer, and wherein the sequence of subterranean formation treatments may be performed in the same or different wells that intersect the same or different subterranean formations.

16. The method of claim 15, wherein the treating fluid residual is a fracturing fluid residual.

17. The method of 15, wherein the treating fluid residual is a gravel pack fluid residual.

18. The method of claim 15 wherein the step of pricing the cost of a plurality of sequential subterranean formation treatments in response to potential reuse of treating fluid residuals from prior treatments in the sequence in subsequent treatments in the sequence comprises pricing a potential reuse in which a treating fluid residuals from a prior treatment would be conditioned before use in a subsequent treatment, and wherein the step of reusing the treating fluid residual that is actually recovered comprises conditioning the treating fluid residual before it is used in a subsequent treatment.

19. The method of claim 15 wherein the cost of pricing the cost of a plurality of sequential subterranean formation treatments in response to potential reuse of treating fluid residuals from prior treatments in the sequence in subsequent treatments in the sequence comprises pricing in response to at least one of the factors selected from the group consisting of: anticipated savings from reuse versus new material costs and disposal costs; risk exposure arising from retrieving, conditioning, storing and transporting a treating fluid residual; gross profit equivalency relative to other types of treatments and relative to an individual well or a group of wells; fees charged for the volume of a prior treating fluid that is not reused; fixed or variable reuse fees charged to offset the expense for maintaining a supply of previously used fluids; fees charged for multiple reuse jobs for the same customer; viscosity of a prior treating fluid; viscosity of a treating fluid residual from a prior treatment; amount of treating fluid residual recovered; cost of any conditioning steps; cost of any bactericide used; storage and transportation costs; labor costs; and a combination of the foregoing factors.

20. The method of claim 19 wherein each factor that is selected is assigned a ratio or weight to define that factor's significance to the pricing.

* * * * *